United States Patent [19]

Armanini

[11] Patent Number: 4,755,229

[45] Date of Patent: Jul. 5, 1988

[54] COLORED MICACEOUS PIGMENTS

[75] Inventor: Louis Armanini, Pleasantville, N.Y.

[73] Assignee: The Mearl Corporation, Ossining, N.Y.

[21] Appl. No.: 12,185

[22] Filed: Feb. 9, 1987

[51] Int. Cl.$^4$ .............................................. C04B 14/20
[52] U.S. Cl. ..................................... 106/413; 106/418; 106/501; 106/417
[58] Field of Search ..................... 106/288 B, 291, 300, 106/308 R, 304, 309

[56] References Cited

U.S. PATENT DOCUMENTS

| | | | |
|---|---|---|---|
| 3,087,828 | 4/1963 | Linton | 106/291 |
| 3,647,492 | 3/1972 | Chapman et al. | 106/291 |
| 3,951,679 | 4/1976 | Bernhard et al. | 106/308 B |
| 4,084,983 | 4/1978 | Bernhard et al. | 106/308 Q |
| 4,205,996 | 6/1980 | Hesse et al. | 106/38 |
| 4,309,480 | 1/1982 | Armanini | 106/291 |
| 4,435,220 | 3/1984 | Watanabe et al. | 106/308 B |
| 4,509,988 | 4/1985 | Bernhard | 106/308 R |

FOREIGN PATENT DOCUMENTS 0220617 6/1987 European Pat. Off. .

*Primary Examiner*—Paul Lieberman
*Assistant Examiner*—Willie J. Thompson
*Attorney, Agent, or Firm*—Ostrolenk, Faber, Gerb & Suffen

[57] ABSTRACT

Dispersed insoluble colored pigments are coated on the surface of mica and oxide-coated mica pigments by deposition in a precipitate of a polyvalent cation and an anionic polymeric substance. The resulting combination pigments have more than one color, depending on the angle of viewing.

21 Claims, No Drawings

COLORED MICACEOUS PIGMENTS

BACKGROUND OF THE INVENTION

This invention deals with colored nacreous pigments and with processes for producing these pigments.

Nacreous pigments produce pearl-like, metallic, and iridescent effects. A widely used type comprises muscovite mica platelets coated with a metallic oxide, such as titanium dioxide. A relatively thin titanium dioxide coating produces a pearl-like or silvery luster. Mica platelets with thicker coatings produce color, even though the components are colorless, through the phenomenon of light interference; they are known as interference pigments. The color, called the reflection color, is seen most effectively by specular or mirror-like reflection, where the angle of reflection equals the angle of incidence. The reflection color is a function of optical thickness, i.e. the geometrical thickness times the refractive index, of the coating. Optical thickness of about 80 nm to about 140 nm produce reflections which may be called white, silvery or pearly; optical thickness of about 190 nm or more produce colored reflections.

Combination pigments are more complex. The oxide-coated mica pigment is further coated with an absorption pigment or dye, so-called because it absorbs some portion of the visible spectrum. If the absorption colorant has the same hue as the reflection color of the oxide-mica pigment, that color is intensified and is seen over a wide range of angles; if it has a different hue, the reflection color or a color close to it is seen at the specular angle, whereas the hue of the absorption pigment is seen at other angles. In some cases, transition colors may be seen between the extremes. Thus a single pigment has more than one color. The absorption colorant coat should be uniform and should adhere firmly to the oxide-coated mica particles.

In known combination pigments, the desired results are achieved by depositing the colorant or a precursor on the pigment platelets from aqueous solution. For example, U.S. Pat. No. 4,309,480 teaches that iron blue (ferric ferrocyanide) may be precipitated onto $TiO_2$-coated mica by the reaction of ferric chloride and potassium ferrocyanide in aqueous solution. Aluminum hydroxide may be precipitated after the iron blue or simultaneously with it, but it is not required for the formation of the iron blue coating. U.S. Pat. No. 3,951,679 shows that an Fe(II) phosphate layer may be precipitated onto mica pigments from aqueous solution and then converted in place to ferrous ferrocyanide by reaction with ferrocyanide solution, followed by oxidation in place to ferric ferrocyanide. U.S. Pat. No. 4,084,983 describes the formation of colored lakes on mica pigments by first depositing aluminum hydroxide on the surface from soluble reactants and then reacting with a dye in solution Many colored pigments of very desirable properties cannot be formed from a water-soluble reactant or reactants. In the present invention, such insoluble pigment particles are dispersed in water and then deposited on the surface of the mica platelets to form continuous, adherent, and smooth colored coatings, creating a new class of combination pigments.

It is an object of the present invention to make combination pigments containing absorption pigments which are not soluble in water and which cannot be formed in place from a water-soluble reactant or reactants. Examples are pigments like the phthalocyanines, quinacridones, perylenes, dioxazines, and carbon black. Although insoluble in water, these pigments can be dispersed in water. They have high color intensity, lightfastness and bleed resistance, properties which make the resulting combination pigments suitable for automotive finishes as well as for general use in paints and in plastics incorporation. They are also useful in cosmetics when cosmetically acceptable components are employed.

SUMMARY OF THE INVENTION

In the present invention, an aqueous dispersion of the colored pigment containing an anionic polymeric substance, such as albumin or xanthan gum, is added to a suspension of the mica or oxide-coated mica pigment. The hydrous oxide of a polyvalent metal, for example chromium(III) or aluminum(III), is then produced by the simultaneous addition of a solution of the metal salt and of a basic solution. The dispersed pigment particles and the polymer deposit with the hydrous oxide of the polyvalent metal to form a smooth, adherent, uniform coating on the mica platelets. While not wishing to be limited to theory, it is likely that the polymer reacts with the polyvalent metal to form a complex hydrous oxide.

The resulting combination pigments exhibit brilliant color and color play, the specific colors depending on the reflection color of the original oxide-mica pigment and the color of the deposited pigment.

DETAILED DISCUSSION

Coated mica pigments are now well known and widely used to produce pearlescent, metallic, and iridescent effects. Colorless oxides, such as $TiO_2$ and $ZrO_2$, are described as coatings for mica in U.S. Pat. No. 3,087,828. Colored oxides, such as $Fe_2O_3$, $Cr_2O_3$, etc., appear in U.S. Pat. No. 3,087,829. Interference pigments of a colorless oxide coated on mica are of particular interest, because the color is derived entirely from the interference effect. They make possible combination pigments with the widest range of colors: any desired reflection color is obtainable by controlling the thickness of the oxide coating, and absorption pigments of any desired color are available for overcoating. For example, a blue-reflecting $TiO_2$-coated mica overcoated with a red absorption colorant appears blue at the specular angle and primarily red at other angles. If the oxide coating consists of or includes a colored oxide, the pigment itself already has a reflection color and an absorption color; the latter modifies the color of the absorption pigment overcoating.

In some cases, the absorption colorant can shift the hue of the reflection color to some extent. This factor is taken into account in deciding on the thickness of the oxide coating to be deposited on the mica.

In order to utilize an insoluble absorption pigment successfully in combination pigments, the insoluble pigment must be very highly dispersed. A convenient starting point is the dry pigment or preferably an aqueous presscake of the pigment. After dilution with water or other liquid, such as alcohol, dispersion is achieved by any one of the usual techniques, such as milling, high shear mixing, or application of ultrasonic energy. The desired degree of dispersion is similar to that conventionally used in paint and coating formulations. It is preferred to add the anionic polymer prior to or during the dispersion step in order to assist the dispersion process.

The polymer-absorption pigment dispersion is combined with a suspension of mica or oxide-coated mica. The pH of the resulting suspension should be in the range suitable for precipitation of the desired polyvalent cation hydroxide or hydrous oxide, generally between about pH 1 and 11, and most frequently between about pH 2 and 8. A solution of soluble salt of the polyvalent cation is then added to the suspension simultaneously with a quantity of a basic material soluble in the solution sufficient to maintain the pH in the desired precipitation range. The absorption pigment is deposited on the platelets to form a smooth, uniform, colored coating. The suspension can then be filtered, and the filter cake washed with water and dried, for example, at 120° C. to produce an easily dispersible powder of the combination pigment.

The anionic polymer is a necessary component in this procedure. Without it, the absorption pigment particles are likely to agglomerate during the polyvalent cation addition and do not deposit on the substrate.

The procedure is effective on mica as well as oxide-coated mica and hydeous oxide-coated mica. The oxide coatings may be of $TiO_2$, $ZrO_2$, $SnO_2$, ZnO, $Fe_2O_3$, $Cr_2O_3$, $V_2O_5$, and the hydrous forms thereof. The oxide may be present in various crystalline forms, for example, $TiO_2$ can be anatase or rutile. Combinations of oxides of two or more metals may be used. The colorless oxides allow the greatest freedom in choice of absorption colorant; the color of the colored oxides influences the choice of absorption colorant because the final absorption color is determined by the mixture of the two colors.

The oxide coating typically has an optical thickness from about 80 to about 600 nm. The mica platelets are from about 3 to about 100 $\mu m$ in their longest direction, and from about 0.1 to 1 $\mu m$ in thickness.

Suitable types of mica for the micaceous pigments of the invention are muscovite, phlogopite, biotite, and synthetic micas. Muscovite is the preferred natural mica because its own light color does not adversely affect the color of the absorption pigment.

Absorption pigments which are water insoluble, transparent (i.e. substantially non-light scattering) and which cannot be formed in situ from a water soluble reactant(s) but which may be highly dispersed in water or water-alcohol containing anionic polymer are suitable for the invention. These include, for example, carbon black and organic pigments in the following groups: azo compounds, anthraquinones, perinones, perylenes, quinacridones, thioindigos, dioxazines, and phthalocyanines and their metal complexes. The pigments, depending on their color intensity, are used in a concentration range of about 0.01% to about 30% based on the weight of mica pigment, preferably 0.1% to 10%.

The useful polymers are those which are capable of precipitating with polyvalent cations at the appropriate pH values. Thus, the polymers are usually anionic, or, like proteins, have both anionic and cationic groups. Useful polymers include albumin, gelatin, polyacrylamides, polyacrylic acids, polystyrene sulfonates, polyvinyl phosphonates, sodium carboxymethyl cellulose and polysaccharides such as xanthan gum, alginates, and carageenin. The polymer content is from about 0.01% to about 20%, preferably from 0.05 to 10%, based on the weight of the mica pigment.

Any polyvalent cation which will form a precipitate with the polymer under given pH conditions can be used. Such polyvalent cations are employed in the form of a solution of a soluble salt. Thus, the cation can be, for example, one or more of Al(III), Cr(III), Zn(II), Mg(II), Ti(IV), Zr(IV), Fe(II), Fe(III), and Sn(IV). Suitable anions include chloride, nitrate, sulfate, and the like. The quantity of polyvalent metal ion is from about 0.01% to about 20%, preferably about 0.05% to about 10%, of the weight of the mica pigment.

The preferred pH range for deposition depends on the particular cation being employed. For Al and Cr(III), it is about 4.0 to 8.0. For Zr(IV), it is about 1.0 to 4.0. The metal salt solution is usually acidic, and the pH of the suspension is maintained at the desired range by addition of a soluble base, such as sodium hydroxide, potassium hydroxide, or ammonia solution. Where the desired pH of precipitation is lower than that of the salt solution, a soluble acid, such as HCl, is added as required.

The effect in each case is to deposit on the mica pigment platelets a complex of metal hydroxide or hydrous oxide and polymer which carries the particles of the absorption pigment with it, to produce a combination pigment with a smooth, adherent colored film on the platelets. After the deposition, the film can be fixed by washing and drying the combination pigment.

The use of chromium as the polyvalent cation for the coating of a rutile-coated mica is of particular interest, inasmuch as chromium hydroxide imparts high resistance to weatherability stress to such pigments, as disclosed in U.S. Pat. No. 4,134,776. The products are suitable for exterior use in such applications as automotive finishes, roof tiles, outdoor furniture, and the like.

The combination pigments of this invention have advantages over multicolor effects obtained by incorporating the mica pigment and absorption pigment separately in a paint or lacquer vehicle. No dispersion step is required for the absorption pigment, since it is already dispersed for maximum effectiveness on the mica pigment surface. The oil absorption requirement of the combination pigment is less than that of the sum of the separate pigments. The tendency of absorption pigment particles to flocculate is eliminated or greatly reduced when the particles are bound to the micaceous platelets. Also, the paint formulator has the convenience of working with fewer components because a two-color effect is achieved by a single pigment.

Colors may be adjusted if desired by mixing combination pigments. In general, it is preferred to mix pigments of the same or similar reflection color, since reflection colors mix additively and color intensity is reduced when very different reflection colors are mixed. The absorption pigment components mix subtractively, and the usual pigment blending procedures are followed.

The new combination pigments may be used in all the usual applications for nacreous pigments: in paints and other coatings, incorporated in plastics, and in cosmetics when the components are acceptable for this use. Furthermore, the specific colors of the combination pigment may be modified, if desired, by the addition of other absorption colorants to the formulation in the conventional way.

The preparation of the combination pigments are best illustrated by the following non-limiting examples:

EXAMPLE 1

Quinacridone red on blue-reflecting anatase-coated mica

An aqueous presscake of quinacridone red (Sunfast Red 19, Sun Chemical Co., 23.7% pigment) was diluted to 0.50% pigment with water. To 250 g of this suspension was added 0.1 g xanthan gum (Kelzan, a microbiolal polysaccharide containing glucuronic acid, Kelco Division). Ultrasonic energy was applied by means of a Sonifier® Model 350 (Branson Sonic Power Co.) for 30 minutes to disperse the pigment.

The mica containing pigment substrate was 50 g of blue-reflecting $TiO_2$-coated muscovite mica (most platelets about 5–50 μm long, average thickness about 0.5 μm, 46% $TiO_2$), suspended by stirring in 400 g of water. The pH value of the suspension was 9.0, and was adjusted to 6.0 with 0.1 N HCl. This suspension was combined with quinacridone red dispersion; there was no significant pH change. A solution of 2.64 g $CrCl_3.6H_2O$ in 165 g water was added at a uniform rate in 100 minutes while maintaining the pH at 6.0 with 3.5% (by weight) NaOH.

Examination of the resulting suspension by optical microscope at 1000× magnification showed that all the red pigment was deposited on the micaceous platelets to form a smooth, uniform red coating. The suspension was filtered, and the filter cake was washed with water. The filtrate and washings were clear and colorless. The filter cake was dried at 120° C. for 1 hour.

Incorporated at 3% by weight in a paint vehicle of the following composition:

| | |
|---|---|
| Acrylic resin thermosetting, 50% NV | 51.78 Parts |
| Melamine, 60% NV | 16.83 Parts |
| Solvent, xylene | 30.29 Parts | the combination pigment yielded a two-color paint which, coated on a surface, had a blue highlight on a red background.

EXAMPLE 2

Phthalocyanine blue on pearl-reflecting rutile-coated mica

An aqueous presscake of phthalocyanine blue (Sunfast Blue 15:3, Sun Chemical Co., 34.6% pigment) was diluted to 0.50% pigment with water. To 250 g of this suspension was added 0.1 g albumin. Dispersion was achieved as in Example 1.

The pigment substrate was 50 g of pearl-reflecting $TiO_2$-coated mica pigment (dimensions as in Example 1; composition 73.2% mica, 26% $TiO_2$, 0.8% $SnO_2$) suspended by stirring in 400 g of water. This pigment has a white-pearl or silvery appearance. The pH value of the suspension was 9.0, and was adjusted to 6.0 with 0.1 N HCl. This suspension was combined with the phthalocyanine blue dispersion. A solution of 0.80 g $CrCl_3.6H_2O$ in 50 g water was added at a uniform rate in 30 minutes while maintaining the pH at 6.0 with 3.5% (by weight) NaOH solution. The suspension was filtered, and the filter cake was washed with water. The filtrate and washings were clear and colorless. The filter cake was dried at 120° C. for 1 hour. The resulting combination pigment, used in the paint vehicle of Example 1, produced a silvery highlight on a blue background.

EXAMPLE 3

Phthalocyanine blue on bronze-reflecting $Fe_2O_3$-coated mica

Phthalocyanine blue was dispersed by the technique of Example 1, except that gelatin was used as the polymer in place of xanthan. The substrate was a bronze-reflecting $Fe_2O_3$-coated mica (32% $Fe_2O_3$) which itself had a yellow absorption color. The polyvalent cation solution was 2.5 g $AlCl_3.6H_2O$ in 50 g water. The pH was kept constant at 5.5 during the addition of the aluminum solution by the simultaneous addition of 3% $NH_3$ solution. The combination pigment had a bronze highlight on a green background, the latter resulting from the color blending of the yellow $Fe_2O_3$ with phthalocyanine blue.

| | Substrate | | Absorption Pigment | | Polymer | |
|---|---|---|---|---|---|---|
| Example | Composition | Refl. Color | Type | Quantity* | Type | Quantity* |
| 3 | Mica 100 | None | Phthalocyanine Green | 7.5 | Carbopol 940 | 0.40 |
| 4 | Mica 60, $TiO_2$ 40 | Red | Dioxazine Carbazole Violet | 5.0 | Gelatin | 0.40 |
| 4 | Mica 61, $TiO_2$ 35, $Fe_2O_3$ 4 | Gold | Quinacridone Red | 2.0 | Xanthan Gum | 0.10 |
| 5 | Mica 54, $TiO_2$ 46 | Blue | Carbon Black | 3.0 | Sodium Alginate | 0.30 |
| 6 | Mica 50, $TiO_2$ 50 | Green | Nickel Azo Yellow | 10.0 | Albumin | 1.20 |
| 7 | Mica 60, $TiO_2$ 39, $SnO_2$ 1 | Gold | Phthalocyanine Blue | 0.6 | Xanthan Gum | 0.20 |

| | Cation | | pH of Precipitation | Color of Product | |
|---|---|---|---|---|---|
| Example | Source | Quantity** | | Spec. Angle (Highlight) | Angles Far From Specular |
| 9 | $CrCl_3\ 6H_2O$ | 0.50 | 6.0 | Green | Green |
| 4 | $AlCl_3.6H_2O$ | 1.12 | 5.5 | Red | Violet |
| 5 | $ZrCl_4$ | 0.40 | 2.0 | Gold | Orange |
| 6 | $ZnCl_2$ | 0.50 | 6.0 | Blue | Dark Gray |
| 4 | $AlCl_3.6H_2O$ | 3.36 | 5.5 | Green | Greenish Yellow |
| 5 | $CrCl_3.6H_2O$ | 0.30 | 6.0 | Gold | Blue |

*g./100 oxide-coated mica pigment
**g. metal ion/100 g. oxide-coated mica pigment

EXAMPLES 4–9

The procedure of Example 1 was followed in Examples 4–9, with the various absorption pigments, polymers, substrates, polyvalent cations and precipitation pH values noted in the following table.

EXAMPLES 10–11

The effect of the combination pigment can be illustrated by its use in an automotive paint. A suitably primed curved metal panel was sprayed with a light gray automotive paint base coat. The paint of Example 2 was sprayed over it. The panel had a silver highlight on a blue background. The panel exhibited excellent light and moisture stability.

The pigment of Example 9 was formulated in a similar manner and sprayed over a white base coat. A clear automotive topcoat was then applied. The finish had a gold highlight on a blue background. In automotive two-coat and three-coat systems, the combination pigment may be used in the bottom coat, middle coat, or top coat.

Other uses will be evident to those skilled in the art.

What is claimed is:

1. A colored micaceous pigment comprising micaceous platelets coated with a layer comprising hydrous oxide or hydroxide of a polyvalent cation, precipitate of said polyvalent cation and an anionic polymeric substance, and water-insoluble colored pigment, the percentages of said cation, substance and pigment based on the weight of said micaceous pigment being 0.01–20, 0.01–20, and 0.01–30, respectively.

2. The pigment of claim 1, wherein said cation is at least one member of the group of Al, Cr, Ti, Zn, Mg, Zr, Fe and Sn.

3. The pigment of claim 1, wherein said cation is chromium.

4. The pigment of claim 1, wherein said cation is aluminum.

5. The pigment of claim 1, wherein said mica platelets are oxide coated.

6. The pigment of claim 1, wherein said platelets are $TiO_2$-coated mica.

7. The pigment of claim 1, wherein said platelets are $Fe_2O_3$-coated mica.

8. The pigment of claim 1, wherein said substance is at least one member of the group of albumin, gelatin, polyacrylic acid, alginate and polysaccharide.

9. The pigment of claim 1, wherein said water-insoluble pigment is a phthalocyanine, quinacridioxazine or carbon black.

10. The pigment of claim 1, wherein said cation is at least one member of the group of Al, Cr, Ti, Zn, Mg, Zr, Fe and Sn and said platelets are mica, $TiO_2$-coated mica or $Fe_2O_3$-coated mica.

11. The pigment of claim 10, wherein said cation is Al or Cr.

12. A paint comprising a paint vehicle and the colored micaceous pigment of claim 1.

13. A paint comprising a paint vehicle and the colored micaceous pigment of claim 10.

14. A method of preparing the colored micaceous pigment of claim 1, which comprises combining an aqueous suspension of micaceous platelets with an aqueous suspension of water-insoluble colored pigment containing an anionic polymeric substance, combining the resulting suspension with an aqueous acidic solution of a polyvalent cation which forms a hydrous oxide or hydroxide precipitate and a precipitate with said substance at a given pH and a quantity of a pH adjustment agent to provide said given pH, and recovering the resulting colored micaceous pigment.

15. The method of claim 14, wherein said agent is a base.

16. The method of claim 15, wherein said cation is at least one member of the group of Al, Cr, Ti, Zn, Mg, Zr, Fe and Sn and said platelets are mica or oxide-coated mica.

17. The method of claim 16, wherein said substance is at least one member of the group of albumin, gelatin, polyacrylic acid, alginate and polysaccharide and said water-insoluble pigment is a phthalocyanine, quinacridone, dioxazine or carbon black.

18. The method of claim 17, wherein said cation is Al or Cr, said platelets are mica, $TiO_2$-coated mica or $Fe_2O_3$-coated mica, and said given pH is about 4–8.

19. The method of claim 18, wherein said base and acidic solution are simultaneously added to said resulting suspension.

20. The method of claim 19, wherein said base is NaOH, the amount of insoluble pigment is about 0.01%–30%, the amount of said substance is about 0.01%–20% and the amount of said cation is about 0.01%–20%, each percentage being based on the weight of said platelets.

21. The product of the method of claim 14.

* * * * *